Dec. 19, 1967   R. T. CALDWELL ET AL   3,358,457
ENGINE COOLING SYSTEM
Filed Feb. 27, 1961   6 Sheets-Sheet 4

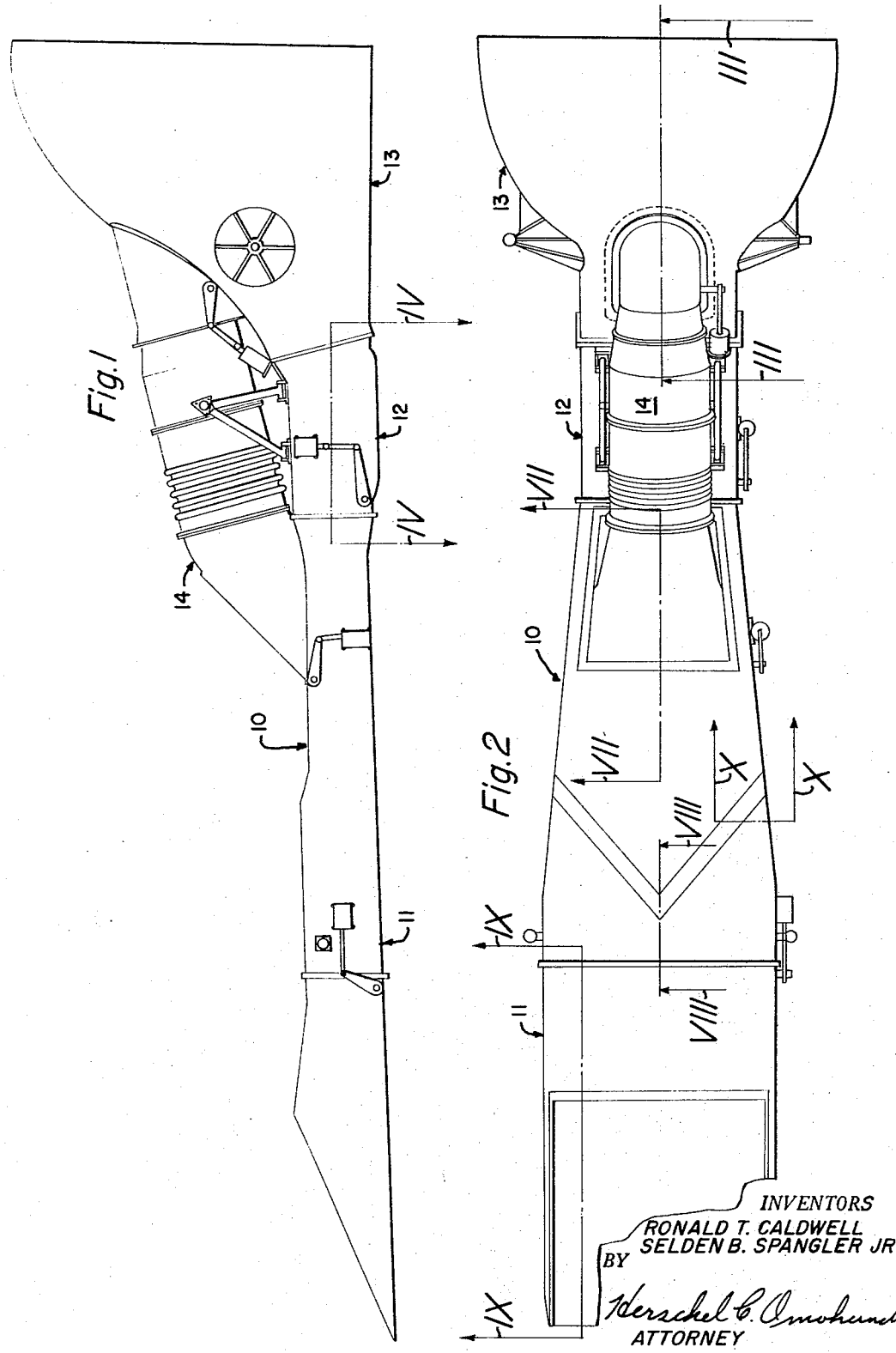

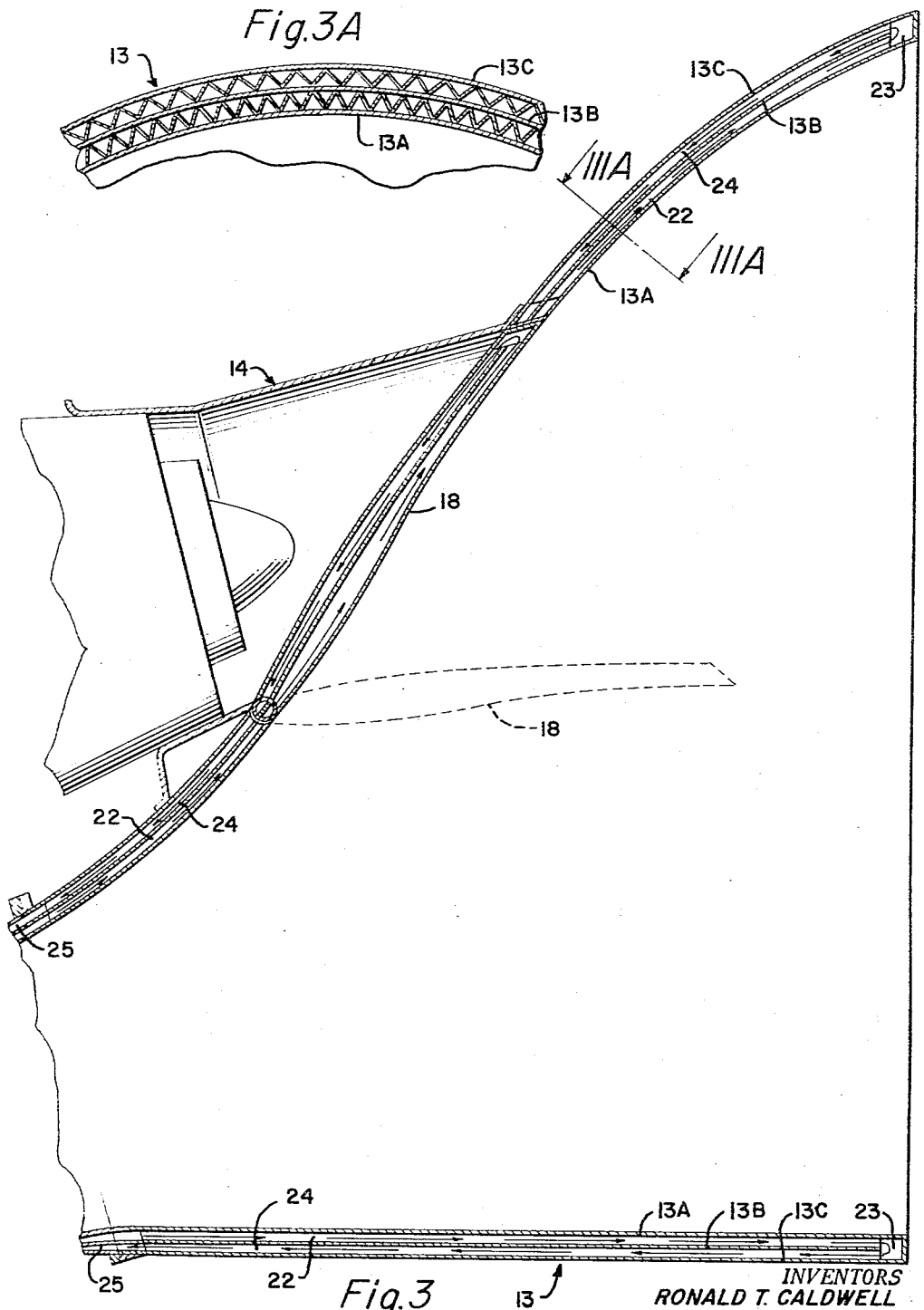

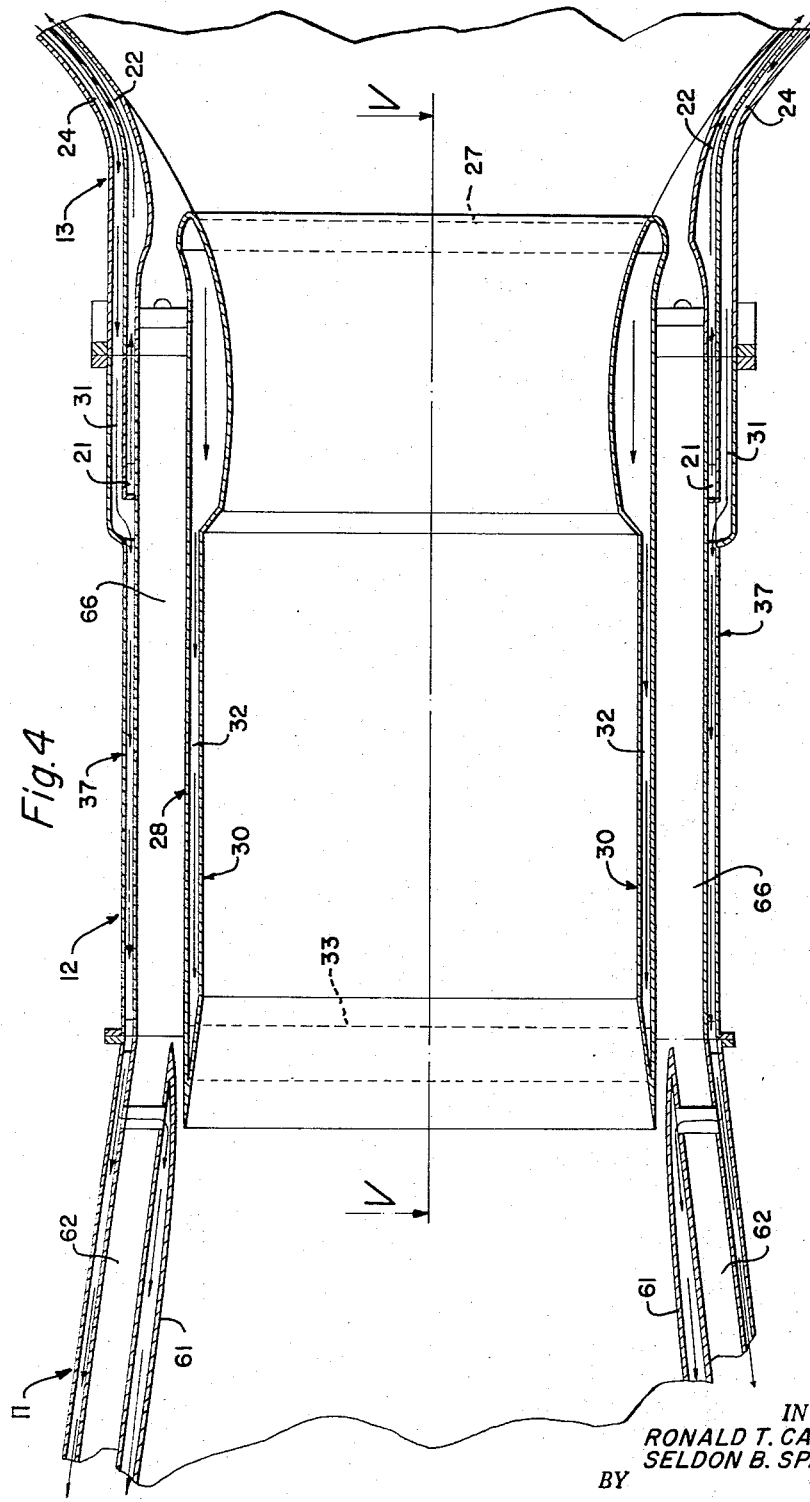

INVENTORS
RONALD T. CALDWELL
SELDEN B. SPANGLER JR.
BY
Herschel C. Omohundro
ATTORNEY Dec. 19, 1967  R. T. CALDWELL ET AL  3,358,457
ENGINE COOLING SYSTEM
Filed Feb. 27, 1961  6 Sheets-Sheet 5
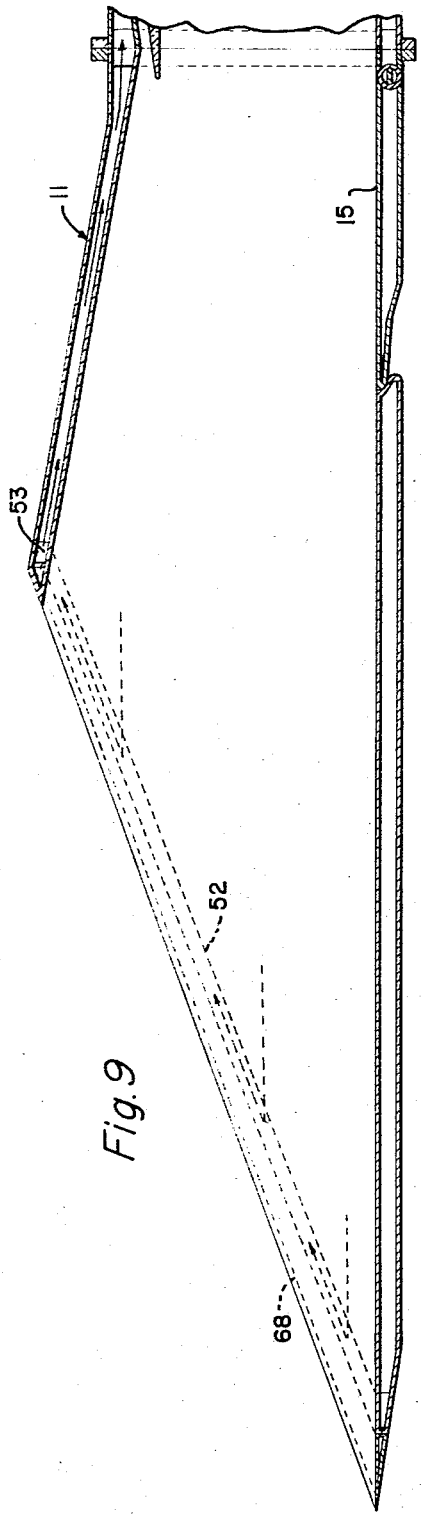
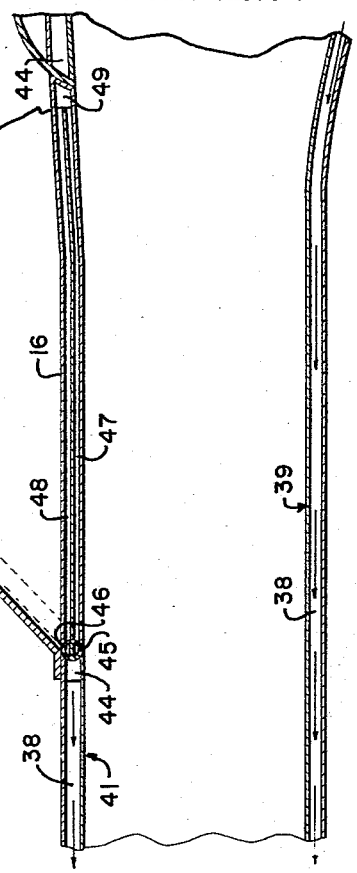
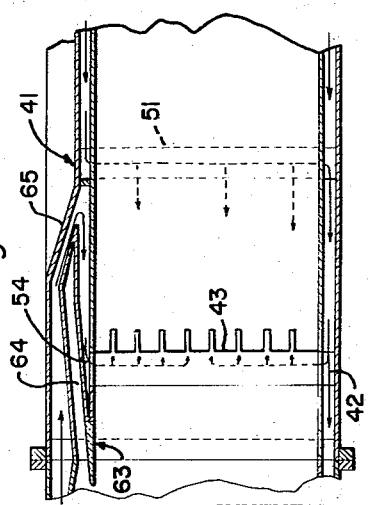
INVENTORS
RONALD T. CALDWELL
SELDEN B. SPANGLER JR.
BY
Herschel C. Omohundro
ATTORNEY

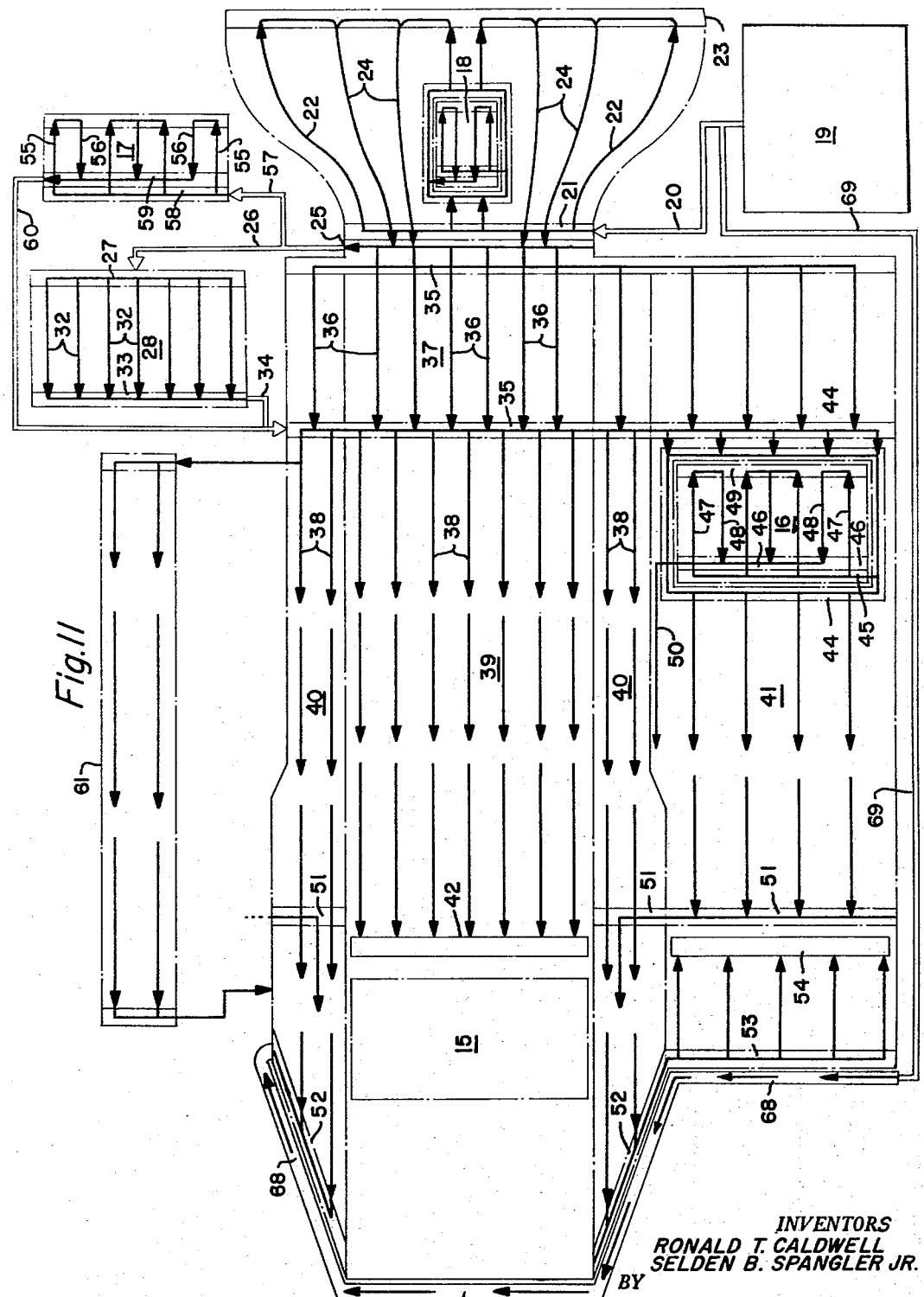

United States Patent Office 3,358,457
Patented Dec. 19, 1967

3,358,457
ENGINE COOLING SYSTEM
Ronald T. Caldwell, Phoenix, and Selden B. Spangler, Jr., Scottsdale, Ariz., assignors to The Garrett Corporation, Los Angeles, Calif., a corporation of California
Filed Feb. 27, 1961, Ser. No. 91,949
8 Claims. (Cl. 60—266)

This invention relates generally to cooling systems. More specifically it relates to engine cooling systems and still more specifically to a cooling system for an engine employed in a vehicle designed for operation at speeds in excess of Mach No. 3, an example of such an engine being illustrated and forming part of the subject matter of copending application Ser. No. 88,149, filed Feb. 9, 1961, in the names of Leslie W. Norman and Skillman C. Hunter and assigned to the assignee of this application.

In the operation of supersonic vehicles, many new and unusual problems, as well as aggravated old ones, are encountered. For example, the high speed of the craft results in high ram air temperatures, which necessitate cooling of portions of the vehicle and engine surfaces. Since ambient air can no longer be used for cooling, the fuel itself or a separate coolant must be carried on board to maintain reasonable structural temperatures. In addition, the use of high energy fuels becomes desirable, which fuels necessarily burn at high temperatures and intensify the cooling problems.

To be still more specific, an engine intended to move a vehicle through the atmosphere in excess of Mach No. 3 has been designed and disclosed in the application above mentioned. This engine operates on a new principle of moving through the atmosphere at such a velocity that air entering the inlet will be raised to a pressure and temperature sufficient to cause the detonation of fuel previously injected into the air stream, the gases resulting from such detonation expanding to produce thrust to propel the vehicle. The ram air entering the engine, as well as that in contact with the exterior surfaces thereof, will be at temperatures high enough to cause premature deterioration of the engine parts. In addition, the detonation of the fuel-air mixture will also cause the development of high temperatures, which will further intensify the problem. It is, therefore, an object of this invention to provide a cooling system for such an engine, the cooling system being so designed as to minimize the deleterious effects of heat resulting from high speed and high temperature combustion.

Another object of this invention is to provide a cooling system for an engine having an inlet or diffusing section, a detonation or combustion section, and an exhaust nozzle section, the cooling system including heat exchanger means forming the walls of the engine and means for circulating a cooling medium through the heat exchanger means in such order that the most efficient cooling will result, the circulating order being such as to minimize temperature gradients across the heat exchanger, thus avoiding harmful effects of consequent high stress gradients.

Still another object of this invention is to provide a cooling system for an engine having a duct divided into diffusing, combustion, and exhaust nozzle sections, the cooling system including passages formed in the duct walls by layers of suitable material separated by one or more corrugated layers, the cooling medium being conducted directly through the passages for intimate heat transfer engagement with the layers exposed to the heated air and gases of combustion and the extended heat transfer fin-like surfaces formed by the corrugated layers.

A further object of the invention is to provide a cooling system for an engine which utilizes a highly volatile fuel, the latter being circulated through engine cooling passages to absorb heat prior to introduction into the engine for combustion, the cooling passages being sized and arranged so that the volume of fuel used for cooling will substantially equal that used for combustion, thereby achieving maximum efficiency and avoiding the discharge of fuel or cooling medium without burning it and securing propulsive forces contained therein.

A still further object of the invention is to provide a cooling system for an engine in which hydrogen fuel is burned, the cooling system being designed to receive the hydrogen either in liquid or gaseous phase, to pass the hydrogen through intimate heat transfer engagements with the various parts of the engine such that the coldest hydrogen comes in contact with those portions of the engine receiving the highest heat flux, and then discharge or inject the fuel from nozzles arranged in the engine into the air stream for detonation.

Another object of the invention is to provide a cooling system for an engine having sections in which different but relatively high temperatures exist, the cooling system being designed with heat exchanger sections forming at least part of the engine walls and having multiple passageways so disposed, sized, and connected that cooling only to the extent necessary to maintain the structural integrity of standard materials will be secured, excessive temperature gradients which might jeopardize the materials of the engine being avoided.

Other objects and advantages will be apparent from the following description of one form of the invention which has been shown in detail in the accompanying drawings.

FIG. 1 is a side elevational view of a detonation jet engine provided with a cooling system embodying the principles of the present invention;

FIG. 2 is a plan view of the engine shown in FIG. 1;

FIG. 3 is a vertical longitudinal sectional view taken through the exhaust nozzle section of the engine on the plane indicated by the line III—III of FIG. 2;

FIG. 3A is a detail sectional view taken on the plane indicated by the line IIIA—IIIA of FIG. 3;

FIG. 4 is a horizontal longitudinal sectional view taken through the detonation or combustion section of the engine on the plane indicated by the line IV—IV of FIG. 1;

FIGS. 7, 8 and 9 are vertical longitudinal sectional views taken through the inlet or diffuser section of the engine on the planes indicated, respectively, by the lines VII—VII, VIII—VIII, and IX—IX of FIG. 2;

FIG. 11 is a flow diagram of the cooling system superimposed on a developed view of the engine, the various sections of the engine being separated and drawn in chain lines.

Figure 5:
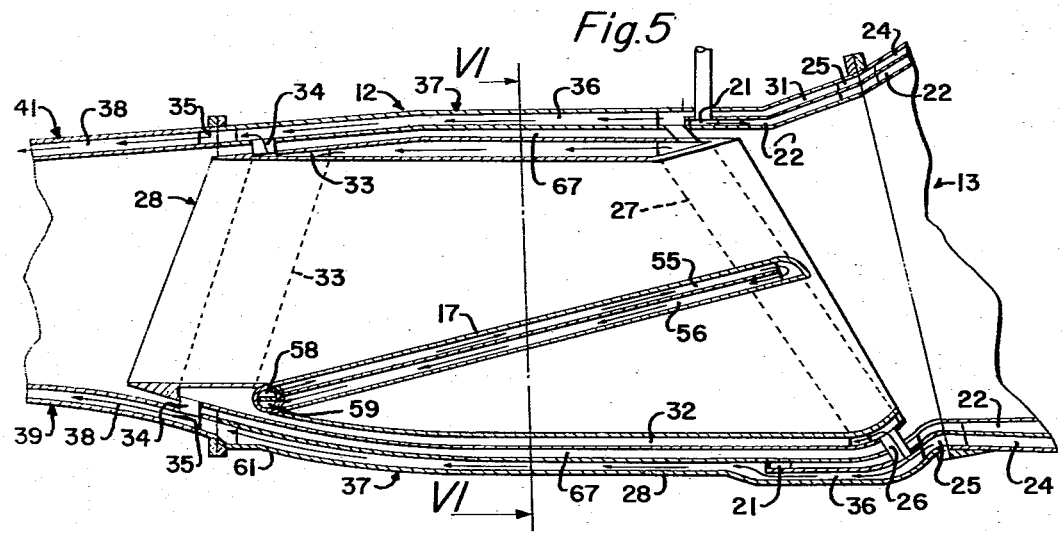
FIG. 5 is a vertical longitudinal sectional view taken through the detonation or combustion section of the engine on the plane indicated by the line V—V of FIG. 4.

Referring more particularly to FIGS. 1 and 2 of the drawings, the numeral 10 designates generally an engine of the type to which the cooling system forming the subject matter of this invention is applied. The engine 10, generally considered, includes three major sections: namely, an inlet or diffuser section 11, a restricted throat or combustor section 12, and an exhaust nozzle section 13. These sections are arranged and integrally joined in the order recited above to form a continuous duct through and in which air will flow, be compressed, mixed with fuel, detonated or combusted, and discharged as a jet to propel the engine and a supporting vehicle through the atmosphere. The engine is also provided with a branch or bypass section 14 in which a suitable gas turbine engine (not shown) is positioned, the latter engine being provided for a particular phase of vehicle operation unimportant to this application. Engine 10 forms the subject matter of a separate copending application, the present application being directed primarily to the cooling system embodied in the engine.

Within the engine 10 there are provided several movable elements, termed "ramps" or "doors," one door 15, termed a "starting door" being movably supported in the bottom wall adjacent the forward end of the inlet section. A second door 16, designated the "landing engine door," is located in the upper wall of the engine and is used to selectively establish and interrupt air flow through the bypass and the gas turbine engine contained therein. A third door or ramp 17, called the "combustor ramp," is mounted on the bottom wall of the engine within the combustor section of the duct for movement to vary the effective cross-sectional area of a restricted throat in the section 12 and to assist in causing air flow through the bypass and gas turbine when door 16 is open. A fourth door 18 is located in the exhaust nozzle section to open and close the outlet end of the bypass. All doors, 15 to 18, inclusive, may be operated by any suitable mechanisms. In the usual operation of engine 10, door 15 occupies a closed position parallel with and forming a part of the bottom wall of the engine. It plays no part in the engine cooling system and needs no further discussion herein. Doors 16 and 18, as shown in full lines in FIGS. 7 and 3, respectively, occupy closed positions in the normal operation of engine 10, being opened as shown in dotted lines in such figures only when the gas turbine in the bypass is to be operated. Door 16 is disposed near the rear end of the inlet section adjacent the forward end of the combustion section and is exposed to relatively high temperatures. Provisions are therefore made in the cooling system to cool this door. Combustor ramp 17 is adjustable during the normal operation of engine 10, and it likewise is exposed to high temperatures. Cooling measures for this door are also provided and will be described later in this specification. Door 18, located in the exhaust nozzle, is likewise exposed to relatively high temperatures, and provisions are made to cool this door.

In the operation of the engine 10, it is moved through the atmosphere at a velocity sufficient to cause air entering the forward end to be increased in pressure and temperature until suitable fuel injected into the air will be detonated. This action will occur in the restricted throat section and the resulting gases will expand through the exhaust nozzle section 13 imparting thrust to the engine and its supporting vehicle. Due to the velocity of the vehicle, the temperature of the ram air will be high and will therefore be unsuitable for cooling the engine.

The system disclosed in the drawings has been provided to circulate the fuel, in this instance hydrogen, through various parts of the engine in a predetermined path to effect its cooling. The flow path of the fuel is disclosed diagrammatically in FIG. 11, to which reference may be made at this time.

Fuel is supplied to the cooling system from a suitable tank or reservoir 19, indicated diagrammatically in FIG. 11, under predetermined pressure. While the hydrogen will normally be stored in the reservoir in its liquid phase, it will probably though not necessarily be supplied to the cooling system in a vapor phase. The fuel is admitted to the cooling system through a line 20 which enters the engine just forward of the connection between the combustor section 12 and the nozzle or exhaust section 13 at the point in the engine which has the highest heat fluxes. Communicating with the line 20 is a manifold 21 which is formed in the engine wall and extends completely around the engine toward the rearward end of the combustor section.

Manifold 21 in turn communicates with a multiplicity of passages 22 spaced peripherally around the rear end of the combustor section and around the nozzle section, these passages extending longitudinally of the engine through the junction between the combustor and nozzle sections and to the rear end of the nozzle section. Passages 22 communicate with a header 23 extending around the outer end of the nozzle section, this header connecting passages 22 with other passages 24 also spaced peripherally around the nozzle section and extending forwardly and longitudinally of the engine to another header 25 at the rearward end of the combustor section at the junction of the two sections 12 and 13. The arrangement of headers 21 and 25 may be seen in FIG. 5.

It will be noted from FIG. 3A that the wall of the nozzle section is composed of inner, intermediate and outer layers 13A, 13B and 13C, respectively, of suitable material spaced by corrugated, tubular, or similarly formed layers which provide extended heat transfer surfaces. The cooling fluid may thus intimately contact such surfaces and extract heat therefrom. This construction may be termed and is referred to herein as "sandwich panel construction." In a typical sandwich panel which is exposed to a hot gas stream on one surface and through the corrugations of which a coolant is flowing, the other surface tends to seek the temperature of the coolant, because of the small amount of heat transferred from the hot surface to the cool surface by the corrugations. It is necessary to minimize the temperature difference between the hot and cold surfaces of the panel because of the thermal stresses induced by this temperature difference. This may be obtained by using a two-layer structure, as shown in FIG. 3A, and flowing the relatively cold coolant through the inner layer adjacent to the hot gas and flowing a relatively warm coolant through the outer layer. Since the cooling fluid, or fuel, will be supplied to the engine in a relatively cool state, it will initially flow through the inner passages 22 and be heated and subsequently flow through the outer passages 24 (FIGS. 5 and 3). This arrangement thus minimizes the temperature difference between the inner and outer surfaces of each wall and thus minimizes the thermal stresses induced by the temperature difference.

Header 25 communicates via passages 26 with a header 27 extending around a combustion chamber liner 28, this liner having heat exchangers 29, 30 and 31 (see FIG. 6) forming the inner bottom, side and top walls, respectively, of the combustion zone of the engine. Each of these walls has spaced layers of suitable material separated by corrugated sheets to provide a plurality of passages 32 connecting at their forward ends with a header 33, which communicates via passages 34 with another header 35 at the junction of the inlet and combustor sections of the engine. Header 25 also communicates via passages 36 extending longitudinally of the outer walls 37 of the combustor section with header 35, which in turn communicates with additional passages 38 extending forwardly through the bottom, side and top walls 39, 40 and 41, respectively, of the inlet section of the engine. Walls 37 and 39–41, inclusive, are constructed similarly to the combustion section liner walls and the nozzle section walls, in that passages therein are formed by corrugated or similarly shaped sheets between relatively smooth sheets to provide extended heat transfer surfaces. FIG. 11 shows that the passages 38 in the bottom wall 39 lead directly to a manifold 42 which feeds fuel injectors 43. These injectors extend vertically between the top and bottom walls 41 and 39 intermediately of the ends of the inlet section. FIG. 11 also shows that the top wall 41 of the inlet section has a header 44 extending around the opening for the bypass 14. As previously pointed out, this opening is closed during normal operation of the engine by a door 16. This door has a hinge end which includes two headers 45 and 46, the first communicating with header 44 and passages 47 leading toward the free edge of the door. The second header 46 communicates with passages 48 leading from a header 49 at the free edge of the door and a passage 50 in the top wall leading toward the forward end of the inlet section.

The passages in the top and side walls of the inlet section communicate at the forward ends with a header 51 extending across the top wall and down the side walls a short distance from their forward ends. Fuel flows from header 51 forwardly in the side walls to headers 52 at the forward end of the side walls, these headers communicating at their upper ends with a continuation 53 extending across the forward end of the top wall. From header 53 the fuel flows rearwardly to another injector manifold 54. Injectors 43 also communicate with manifold 54.

FIG. 5 shows that the combustor ramp 17 has top and bottom passages 55 and 56 similar to those in doors 16 and 18. FIG. 11 shows that a branch 57 leads from the passage 26 to a header 58 formed at the hinged end of the ramp 17. Passages 55 lead from header 58 to the free end of ramp 17 where they connect with passages 56 leading back to another header 59 at the hinged end. Header 59 communicates via passage 60 with header 35 at the rear end of the inlet section of the engine.

Figure 10:
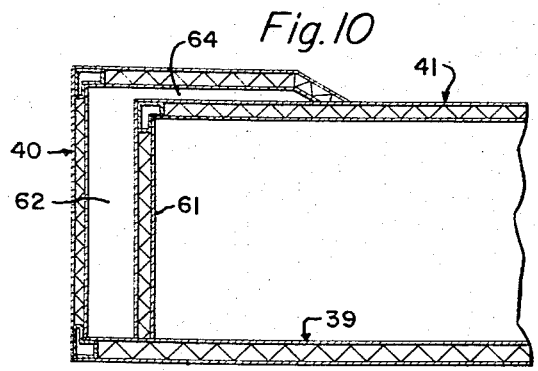
FIG. 10 is a detail vertical transverse sectional view taken through the inlet section of the engine on the plane indicated by the line X—X of FIG. 2.

FIGS. 4 and 10 show that inner partitions 61 are provided at the sides of the inlet section in spaced relation from the side walls 41 thereof. The spacing of these inner partitions from the side walls forms ducts 62 for bleeding boundary layer air from the inlet ends of the side walls. Such ducts 62 also receive boundary layer air from the top wall of the scoop-like front end of the inlet section. To permit this function, the top wall, as shown in FIG. 8, has a depending, forwardly projecting lip 63 which extends across the inlet section and is spaced from the top wall to provide a passage 64. The top wall at the back edge of this passage is slightly depressed as at 65 and, as shown in FIG. 2, the depressed portions extend diagonally from the center of the duct rearwardly toward the side walls. The passage 64 connects at the sides with the ducts 62. The bleed air flowing through the ducts 62 and continuations 66 provided between the liner 28 and outer walls of the combustion section will impart a relatively high temperature to the outer surface of the liner 28, thus preventing excessive temperature differences and premature deterioration of structure resulting therefrom.

As shown in FIG. 11, each partition 61 receives cooling fluid from the adjacent side wall and returns such fluid to the side wall after it has passed longitudinally through the partition. While only one partition has been illustrated in FIG. 11, it is clear from FIG. 4 that both sides of the inlet section will be so constructed. FIGS. 4 and 5 show that boundary layer air will be admitted at the front end of the combustion chamber liner to the ducts 67 at the top and bottom as well as the duct continuations 66 at the sides.

Figure 6:
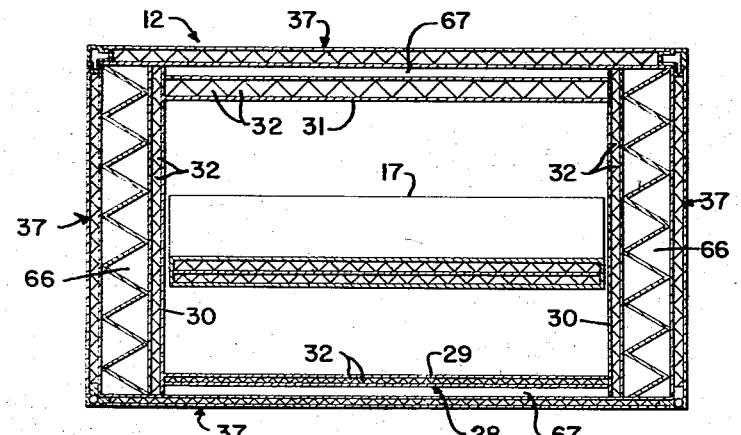
FIG. 6 is a vertical transverse sectional view of the combustion section of the engine taken on the plane indicated by the line VI—VI of FIG. 5.

FIG. 6 shows that the boundary layer bleed air ducts 66 and 67 may also be provided with corrugated material to provide extended heat transfer surfaces. To resist excessive heat generated by ram air engaging the forward edges of the scoop-like front end of the inlet section, the edges are provided with a passage 68 which extends completely around the open end. This passage is supplied directly from the fuel storage tank via a line 69 and the outlet end of the passage is connected with the header 52. The edges of the inlet end of the inlet section are thus protected from overheating by fuel flowing from the tank 19, through the passage 68, and to the header 52, from which it will flow to the manifold 54. From the latter the fuel will flow through the injectors 43 into the air passing through the inlet section.

We claim:

1. In an engine of the type having a duct with a diffuser inlet section, a restricted throat section, and a diverging exhaust nozzle section, said inlet section being so shaped that when the duct is moved at a predetermined range of speeds through the atmosphere a shock wave of sufficient strength to increase the temperature and pressure of a suitable fuel and air mixture to the detonation condition thereof will be created at said throat section, a cooling system comprising: superposed passage means formed in the walls of said duct, each passage means having a plurality of layers of material separated by at least one layer shaped to provide extended heat transfer surfaces; means for admitting a fluid cooling medium to predetermined passage means; and means for directing boundary layer air from within predetermined portions of said duct through other passage means.

2. In an engine of the type having a duct with a diffuser inlet section, a restricted throat section, and a diverging exhaust nozzle section, said inlet section being so shaped that when the duct is moved at a predetermined range of speeds through the atmosphere a shock wave of sufficient strength to increase the temperature and pressure of a suitable fuel and air mixture to the detonation condition thereof will be created at said throat section, a cooling system comprising: heat exchanger means formed by the walls of said duct, said heat exchanger means having a portion adjacent said throat section including inner, intermediate, and outer passages; means directing a coolant through said inner and outer passages; and means for directing boundary layer air from the diffuser section of said duct through said intermediate passages.

3. In an engine of the type having a duct with a diffuser inlet section, a restricted throat section, a diverging exhaust nozzle section, and an adjustable ramp for varying the effective cross-sectional area of said restricted throat section, said inlet section being so shaped that when the duct is moved at a predetermined range of speeds through the atmosphere a shock wave of sufficient strength to increase the temperature and pressure of a suitable fuel and air mixture to the detonation condition thereof will be created at said throat section, a cooling system comprising: passage means formed in the duct walls at the diffuser, throat and nozzle sections and in said adjustable ramp; adjustable connection means between the passage means in said ramp and said duct walls; and means for directing a cooling fluid through said passage means to absorb heat from said engine sections and said adjustable ramp to maintain predetermined passage wall temperatures.

4. In an engine of the type having a duct with a diffuser inlet section, a restricted throat section, and a diverging exhaust nozzle section, said inlet section being so shaped that when the duct is moved in a predetermined range of speed through the atmosphere a shock wave of sufficient strength to increase the temperature and pressure of a suitable fuel and air mixture to the detonation condition thereof will be created at said throat section, a cooling system comprising: passage means formed in the walls of said duct by providing a plurality of layers of sheet material separated by at least one layer of corrugated sheet material, the corrugations providing passages extending generally longitudinally of said duct; header means connecting the end portions of certain passages to cause fluid flow in a predetermined path; and means for directing a fluid cooling medium to a header at the front end of said exhaust nozzle section, said fluid flowing rearwardly through the inner passages in said exhaust nozzle section then forwardly through the outer passages therein to and through the passages in said throat section and said diffuser section.

5. In an engine of the type having a duct with a diffuser inlet section, a restricted throat section, and a diverging exhaust nozzle section, said inlet section being so shaped that when the duct is moved at a predetermined range of speeds through the atmosphere a shock wave of sufficient strength to increase the temperature and pressure of a suitable fuel and air mixture to the detonation condition thereof will be created at said throat section, a cooling system comprising: passage means formed in the duct walls at the diffuser, throat, and nozzle sections, said passage means being arranged and connected to provide said nozzle section with an inner layer of flow paths extending from front to rear and an outer layer of flow paths extending from the rear to the front, said throat and diffuser passages extending longitudinally thereof and being connected with one another and with the outer layer of flow paths in the nozzle; and means for admitting a fluid cooling medium to the forward ends of the inner layer of flow paths in said nozzle section, such cooling medium flowing rearwardly in such flow paths then forwardly in the flow paths of the outer layer and forwardly in the passages in the throat and diffuser sections.

6. An engine of the type described in claim 5 wherein said passage means, in said throat section, includes mutually spaced, inner and outer flow path means, both in fluid communication with the outer layer of flow paths of said nozzle section and extending toward said diffuser section, the space between said inner and outer flow path means of said throat section comprising a passageway for boundary layer air received from said diffuser section, said boundary layer air flowing through said passageway in a direction toward said nozzle section and said cooling medium flowing through said inner and outer flow path means of said throat section toward said diffuser section.

7. An engine as described in claim 6 wherein said passage means in said diffuser section includes outer flow path means disposed within outer wall means of said diffuser section and inner flow path means disposed within the outer flow path means of said diffuser section, said inner flow path means of said diffuser section comprising first and second cooling medium passages lying, respectively, on opposite sides of said diffuser section, with spaces between said inner and outer flow path means of said diffuser section defining passageways for the flow of boundary layer air received by said diffuser section, said boundary layer air flowing through said spaces in a direction toward said throat section of said engine so as to enter the space between said inner and outer flow path means of said throat section.

8. In an engine of the type having a duct with a diffuser inlet section, a restricted throat section, and a diverging exhaust nozzle section, said duct being shaped to create a shock wave system which will cause the detonation of a suitable fuel and air mixture at the throat section when the duct is moved at a predetermined speed through the atmosphere, a cooling system comprising: passage means formed in the walls of said duct and arranged to provide inner rearwardly and outer forwardly extending flow paths in said nozzle section and flow paths extending forwardly of said throat and inlet sections; means for admitting a cooling fluid medium to the forward ends of said inner flow paths to extract heat from gases flowing through said nozzle and transmit heat to the outer walls of said nozzle, such cooling medium then flowing forwardly along the flow paths in said throat and inlet sections; and injector means communicating with the passage means adjacent the forward portion of said inlet section for spraying the cooling medium into air flowing through said duct.

References Cited

UNITED STATES PATENTS

| 2,586,025 | 2/1952 | Godfrey | 60—35.6 |
| 2,794,319 | 6/1957 | Stockdale | 60—35.6 |
| 2,853,854 | 9/1958 | Avery et al. | 60—35.6 X |
| 2,866,313 | 12/1958 | Holl | 60—35.6 |
| 2,914,915 | 12/1959 | Sziklas et al. | 60—35.6 |

FOREIGN PATENTS 847,953  9/1960  Great Britain.

OTHER REFERENCES

"Scientists Study Mach 7 Ramjet Theory" by Robert H. Cushman, Aviation Week, Jan. 6, 1958, pages 57–59 and 63.

MARK M. NEWMAN, *Primary Examiner.*

SAMUEL FEINBERG, *Examiner.*